United States Patent
Conte et al.

(10) Patent No.: US 9,276,816 B1
(45) Date of Patent: Mar. 1, 2016

(54) RESOURCE MANAGEMENT TOOLS TO CREATE NETWORK CONTAINERS AND VIRTUAL MACHINE ASSOCIATIONS

(75) Inventors: Charles R. Conte, Gaithersburg, MD (US); Venkata R. Josyula, Millstone Township, NJ (US)

(73) Assignee: CISCO TECHNOLOGY, INC., San Jose, CA (US)

(*) Notice: Subject to any disclaimer, the term of this patent is extended or adjusted under 35 U.S.C. 154(b) by 596 days.

(21) Appl. No.: 13/007,897

(22) Filed: Jan. 17, 2011

(51) Int. Cl.
*G06F 15/177* (2006.01)
*H04L 12/24* (2006.01)

(52) U.S. Cl.
CPC .......... *H04L 41/0893* (2013.01); *H04L 12/24* (2013.01)

(58) Field of Classification Search
CPC . H04L 12/66; H04L 12/2602; H04L 41/0843; H04L 41/0893
USPC ........................................... 709/220
See application file for complete search history.

(56) References Cited

U.S. PATENT DOCUMENTS

| | | | | |
|---|---|---|---|---|
| 7,477,600 | B1* | 1/2009 | Mor et al. | 370/231 |
| 7,698,383 | B2* | 4/2010 | Goring et al. | 709/219 |
| 2004/0199614 | A1* | 10/2004 | Shenfield et al. | 709/220 |
| 2010/0293269 | A1* | 11/2010 | Wilson et al. | 709/224 |
| 2011/0295998 | A1* | 12/2011 | Ferris et al. | 709/224 |
| 2011/0320605 | A1* | 12/2011 | Kramer et al. | 709/226 |
| 2012/0173686 | A1* | 7/2012 | Doyle et al. | 709/223 |

\* cited by examiner

*Primary Examiner* — Hua Fan
(74) *Attorney, Agent, or Firm* — Patterson & Sheridan, LLP (57) ABSTRACT

Provisioning of network containers provided as part of a cloud computing service. A network container defines a logical network topology to be hosted on a physical network infrastructure. One or more templates are populated using parameters and a network container profile associated with a requested network container. The requested network container is provisioned by translating the populated templates into a sequence of commands executed to configure the physical network infrastructure to host the requested network container.

21 Claims, 11 Drawing Sheets

![Screenshot of "Create New Network Container" form interface, numbered 800]

Form fields visible:
- Request Details section (805): User ID: customer2, Name: customer 2, Phone: 1 571 521-8658, Email: chconte@cisco.com, Cost Center:
- Network Package: Gold (810)
- Container Name: FT-IT-BU1 (815)
- System Location: RTP, NC (820)

Left navigation: Request Details, Firewalls, Load Balancers

Technical Service Request http://172.18.80.55/arsys/forms/itsm/VLM%3ASRM%3ARequestNewServerInstance/Administrator/?cacheid=57342450

Technical Service Request

- Instance Type
- Application Stacks
- Optional Settings
- Request Details
- Summary

Instance Details

Choose a template or define a custom instance build

⦿ Requestable Offerings  ○ Custom  } 852

| | | | | |
|---|---|---|---|---|
| Gold LAP Gold<br>Linux, Apache, PHP with 1 CPU,<br>2GB RAM, 30GB HD | Linux | Pre Approved | Size: | ▷ |
| Gold LSGOB Gold<br>Linux, MySQL with 1 CPU,<br>2GB RAM, 30GB HD | Linux | Pre Approved | Size: | ▷ |
| Gold LIJ Gold<br>Windows Server 2003, IIS, Jonas<br>with 1 CPU, 2GB RAM, 30GB HD | Windows | Pre Approved | Size: | ▷ |
| Gold LIP Gold<br>Windows Server 2003, IIS, PHP<br>with 1 CPU, 2GB RAM, 30GB HD | Windows | Pre Approved | Size: | Medium-$19.99/Month ▷ |

Quantity: 1

CompleteRequest >>   < Back   Next >   Cancel

RESOURCE MANAGEMENT TOOLS TO CREATE NETWORK CONTAINERS AND VIRTUAL MACHINE ASSOCIATIONS

TECHNICAL FIELD

Embodiments presented in this disclosure generally relate to providing access to virtualized computing resources, and more particularly, to resource management tools used to create network containers and virtual machine associations.

BACKGROUND

Cloud computing has become a popular approach for obtaining access to (sometimes large-scale) computing resources. Cloud computing allows users to build virtualized data centers which include compute, networking, application, and storage resources without having to build or maintain a physical computing infrastructure. The virtualized data center may provide a user with a segmented virtual network located in the cloud, typically alongside virtualized data centers of other users. Such a virtualized data center may be rapidly scaled up (or down) according to the computing needs of a given user without the need to maintain excess computing capacity between peak demand periods. For example, an online retailer can scale a virtualized data center to meet increased demand during the holiday shopping season without having to maintain the underlying physical computing infrastructure used to provide the retailer's online presence.

The ability to successfully provide a cloud computing service depends on a number of factors, including the ability to provide effective end-to-end management services, security, and the ability to quickly provision services for customers. However, provisioning frequently takes days or even weeks, as configuring even a simple virtualized data center can require hundreds, if not thousands of variables, parameters and settings to be specified. For example, settings for virtualized networking components (e.g., routers, switches, firewalls, etc.), virtual machines and, a desired set of applications all need to be specified and used to configure the underlying physical computing infrastructure. Typically, a network engineer maintains a database or spreadsheet of settings for a given virtualized data center. Using this information, the network engineer manually configures the underlying physical systems to provide a virtualized data center that meets the specifications of a given customer.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Embodiments described herein include resource management tools and methods used to create network containers and virtual machine associations. One embodiment includes a method including receiving a request to provision a network container. The network container defines a logical network topology to be hosted on a physical network infrastructure. This method may further include receiving one or more parameters specifying a configuration state for the requested network container, populating one or more templates using the parameters and a network container profile associated with the requested network container, and provisioning the requested network container by translating the populated templates into a sequence of commands executed to configure the physical network infrastructure to host the requested network container.

Additional embodiments include a computer readable storage medium, storing a program configured to perform the aforementioned method, and a system having a processor and a memory storing a program configured to perform the aforementioned method.

Description of Example Embodiments

Embodiments described herein provide a method for abstracting and automating the provisioning of an end-to-end network partition or virtualized data center for multi-tenant users as well as a method for launching and executing virtual machines (VMs) in a given user's network partition. Each virtualized data center provides services such as load balancing, firewall, multi-VLANs (sub-container's), MPLS VPN services, delivered to users as a complete end-to-end service.

Embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, users may create a virtualized data center hosted in a network container. As described in greater detail below, a network container is a logical network or partition of a physical network infrastructure used to provide a complete segmentation over a shared infrastructure. For example, each network container running of a shared infrastructure can re-use the same IP address space. A network container helps a service provider to maximize hardware utilization as well as allow functionalities such as security and application optimization to be managed by the customer.

In one embodiment, a network container provides an abstraction of network resources which may be presented to users through a self-service portal. Providing users with a selection of pre-defined network containers mitigates the need for manually provisioning each network element in the underlying core, aggregation and access layers, which in turn greatly reduces, if not outright eliminates direct operator involvement in provisioning a virtualized data center. As a result, the network container approach described herein may reduce service provisioning time from days and weeks to practically minutes, in some embodiments. Further, once a user requests a given network container, the self-service portal may also allow users to specify and launch virtual machines inside their containers. In one embodiment, a network container management system may be configured to create a network container upon request and instantiate any requested virtual machine instances within that network container. As described in greater detail below, the resource management and work flow mechanisms provided by such a system allow resource provisioning to be automated through the placement of variables in the physical data center systems. Thus, the once complex and manual process is automated, while at the same time providing the benefits of giving customers an end-to-end partitioned environment. Doing so may help eliminate administrative and configuration errors, eliminate manual documentation of used resources, and minimize inter-group technology coordination, as well as increase productivity through the reduction in the service deployment time.

The following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

Figure 1:
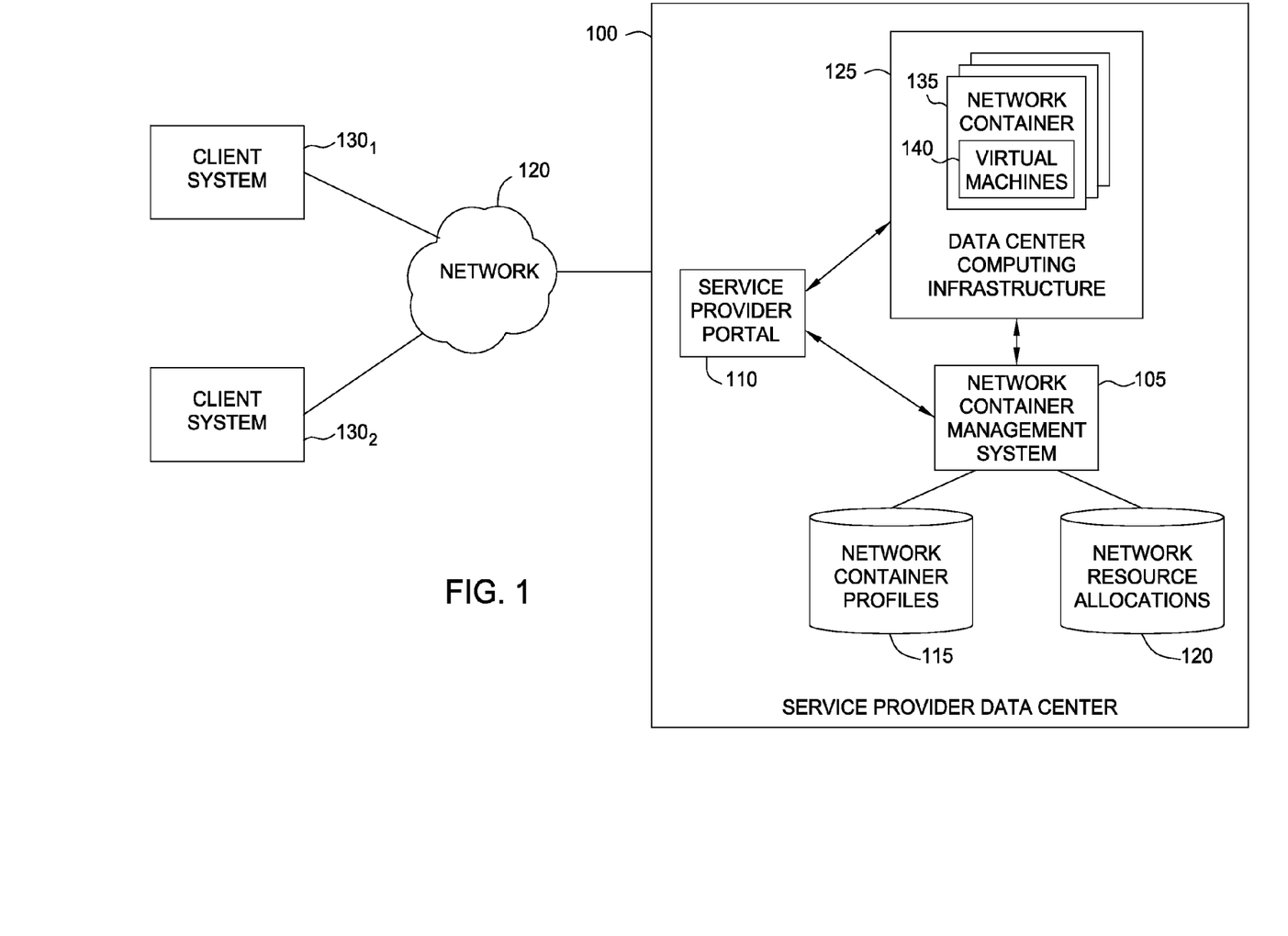
FIG. 1 illustrates an example computing infrastructure used to host virtualized data centers, according to certain embodiments of the present disclosure.

FIG. 1 illustrates an example computing infrastructure used to host virtualized data centers, according to certain embodiments of the present disclosure. As shown, the computing infrastructure includes a service provider data center 100 and client systems $130_{1-2}$, each connected to a communications network 120. The client systems $130_{1-2}$ generally each represent a computing system used to request, configure, and manage a virtualized data center (i.e., a network container and a collection of virtual machines) hosted by a cloud computing service provider (e.g., at service provider data center 100). In one embodiment, client systems $130_{1-2}$ communicate over the network 120 in order to interact with a service provider portal 110. Accordingly, each client $130_{1-2}$ may include web browser software used to create a connection with the service provider portal 110 and to receive and render web pages. In turn, the service provider portal 110 may include, e.g., a web server, application server, and a database used to provide a web-based interface for managing a network container provided to the client systems $130_{1-2}$. An example of such an interface is shown in FIGS. 8A-8D described below.

The service provider data center 100 includes a network container management system 105, the service provider portal 110, computing infrastructure 125, network container profiles 115 and network resource allocations 120. The computing infrastructure 125 represents the physical computing infrastructure used to provide cloud-based, virtualized datacenters and network containers to customers upon request. As such, the computing infrastructure 125 may include server computing systems (e.g., blade systems or other rack mounted server computers), software, network devices (e.g., routing and switching devices), and storage systems (e.g., NAS, SAN storage devices), along with the appropriate cabling, cooling, and power systems, used to provide cloud computing services.

Illustratively, computing infrastructure 125 is shown hosting a plurality of network containers 135. Each network container 135 is a logical network or partition of the computing infrastructure 125 used to provide a user with complete logical segmentation on the shared computing infrastructure 125. Each network container 135 may host a collection of instances of virtual machines 140. As is known, a virtual machine 140 generally provides a virtualized computing environment (typically, a virtual processor, memory, and storage) on which a guest operating system and associated application software can run. Multiple virtual machines can operate on the same host machine concurrently.

In one embodiment, users launch virtual machines 140 and run them inside one of their network containers 135. Thus, taken together, a given network container 135 and group of virtual machines 140 provide a virtualized data center that a user can scale up (or down) on demand. For example, an online retailer may create a network container 135 used to host a number of web, application, and database servers inside a network container 135. Such a network container 135 could include a front-end access point, a virtualized firewall and load balancer used to distribute web-page requests to a pool of web servers running on virtual machines 140. Such a group of virtual machines 140 may be part of a common network segment associated with the online retailer's network container on the computing infrastructure 125. As demand increases (e.g., during the holiday shopping season) the retailer can spawn additional virtual machines 140 to handle this peak demand period. Following such a demand period, the additional virtual machines 140 can be shut down and the resources used to provide those virtual machines 140 can be returned to the shared resource pool provided by the computing infrastructure 125.

As shown, the service provider data center 100 also includes the management system 105, network container profiles 115 and network resource allocations 120. As described in greater detail below, the management system 105 is a computing system with software components used to configure and manage the network containers 135 hosted by the computing infrastructure 125. The network container profiles 115 provide a set of one or more templates used to define what virtualized elements need to be specified in order to create a network container 135 (e.g., virtual routing and forwarding (VRF) tables, VPN and VLAN configuration data, IP address ranges, mask and broadcast addresses, device contexts, firewall rules, etc.). More generally, the template variables generally specify a configuration state for the requested network container. The allocation and configuration of the computing infrastructure 124 may be stored in the network resource allocations 120.

In one embodiment, to create a given network container 135, a user specifies which profile 115 to use and supplies a set of parameters for the selected profile. The parameters generally specify a configuration state for the requested network container. In response, the management system 105 may create a network container 135 having the characteristics associated with the selected network container profile 115. For example the management system could configure a VRF table on the computing infrastructure 125 on a per network container 135 basis. Doing so provides each network container 135 with a virtualized Layer 3 Forwarding and Routing Table. Similarly, routing and switching devices in the computing infrastructure 125 could be configured with a virtual device context used to indentify a given network container 135. Doing so creates separate management and control planes for each network container 115. Similarly still, VLAN(s) could be created to provide virtual segmentation within the network containers and the management system 105 could also define virtualized connectivity options, e.g., MPLS VPN, IPSEC, etc., for a network container 135.

While the profiles 115 can be tailored to suit the needs of a given provider (or user), the profiles 115 could include a "base" profile which defines a network container with an access point, an IP address range, and routing information used to create a partitioned network segment on the shared infrastructure 125. Virtual machines 140 could then be spawned and configured with network address taken from the IP address range assigned to such a network container 135. A second, or "silver," profile could include all the configuration elements of the "base" profile but also provide a virtualized firewall between the network access point and the virtual machines associated with a given network container. Similarly, a "gold" profile could include the elements of the "base" and "silver" profiles but also provide with a virtualized load balancer.

Figure 2:
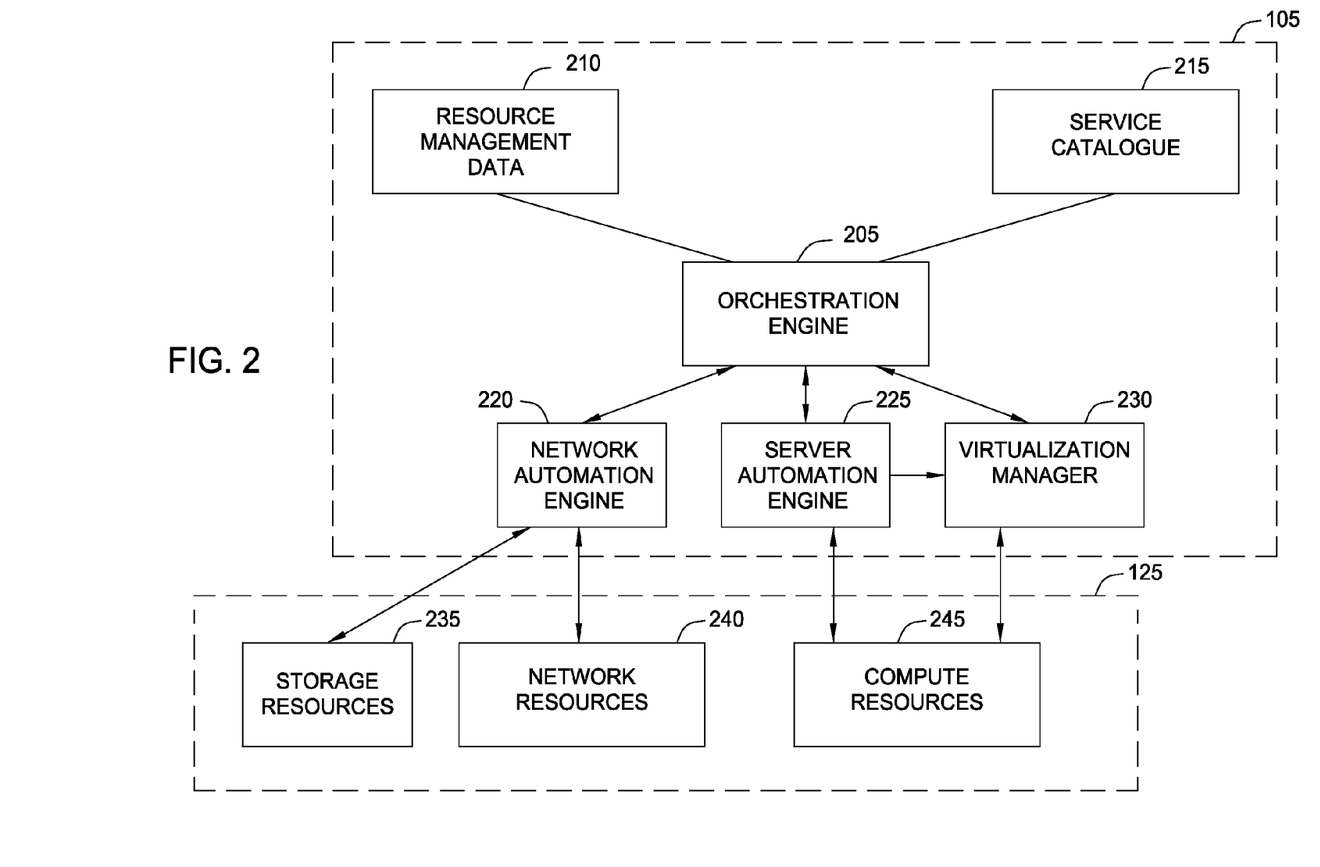
FIG. 2 is a block diagram illustrating an example of components of a management system used create and manage virtualized data centers, according to certain embodiments of the present disclosure.

FIG. 2 is a block diagram illustrating an example of components of a management system used create and manage virtualized data centers, according to certain embodiments of the present disclosure. As shown, the network management system includes an orchestration engine 205, resource management data 210, service catalogue 215, a network automation engine 220, a server automation engine 225 and a virtualization manager 230. Additionally, the computing data center infrastructure 125 includes compute resources 245, network resources 240 and storage resources 235.

In one embodiment, the orchestration engine 205 provides a software application configured to manage a set of network containers provisioned on the underlying shared computing infrastructure 125. The service catalogue 215 stores a description of the network container offerings made available by the service provider. As noted, such a portal may be used to provide a self-service interface to the network container and virtual machine cloud computing services offered by the service provider.

The orchestration engine 205 may receive a request to create a network container defined in service catalogue 215. In response, the orchestration engine 205 may access resource management data 210 in order to determine whether the underlying shared computing infrastructure 125 has resources available to support a requested network container. The resource management data 210 may provide a repository that describes all of the computing resources in the computing infrastructure 125, whether available or used. The resource management data 210 may also include all configuration items for the network containers provisioned on the computing infrastructure 125, including attributes related to technical configuration and user details. For example, customers owning IP addresses VLAN addresses VMs, etc., may be stored in the repository provided by the resource management data 210.

Provided the resources are available, the orchestration engine 205 may interact with the network automation engine 220 to provision the computing infrastructure 125. For example, the network automation engine 220 may be configured to provision network resources 240 such as routers, switches, load balancers, firewalls, or other networking appliances as well as configure storage resources 235 (e.g., SAN switches, NAS device or others storage volumes on an array of disk storage devices). In one embodiment, the network automation engine 220 may use one or more templates associated with a given network container (as defined in the service catalogue 215) to generate command statements used to provision the network resources 240. Further, the network automation engine 220 may expose the capabilities it provides using an open API (e.g., exposing methods to configure the underlying network resources 240 using a web service defined using WSDL). Thus, in one embodiment, the orchestration engine 205 may create web service requests passed to the network automation engine, which in turn generates the appropriate command line interface statements to provision network resources 240 in order to provision a requested network container on the network resources 240 and storage resources 235.

Similarly, the orchestration engine 205 may interact with the virtualization manger 230 to launch a group of virtual machines on the compute resources 245. Once launched, the server automation engine 225 may be used to provision the virtual machines. For example, the server automation engine 225 may provide a follow on package management tool, system configuration, and modification tools. Thus, the server automation engine 225 could be used to install, configure, modify, remove web servers, database applications, application servers or other application programs on virtual machines launched using the virtualization manger 230.

Once provisioned, the orchestration engine 205 may be configured to track any changes to a user's network container made using the self service portal. In some cases, operations staff may need to approve a given change request based on the work the user has requested. Of course, some changes (or some users) may be provided automatic approval for certain change requests. For example, minor changes such as adding a VM in the network container would not need an approval process through change management, in one embodiment. In contrast, adding complex network containers (e.g., a "gold" network container with virtualized firewalls and virtualized load balancers) may need a change management approval as some form of human interaction may be appropriate. In this manner, a degree of oversight by the administrator of the hosted service is initially maintained for some of the more complex services. After a while of tracking and understanding the request, changes could bypass the change request as future services may be sent through change management.

More generally, it allows a service provider to determine whether complex services (or new services that have not been widely deployed) will not be disruptive to the provider's infrastructure.

Further, the orchestration engine 205 may be configured to respond requests to shut down or reduce the resource included in a given network container. In such a case, the orchestration engine 205 may interact with the network automation engine 220 and server automation engine 225 to "tear-down" a given virtualized data center (or parts thereof) and update the resource management data 210 accordingly.

Figure 3:
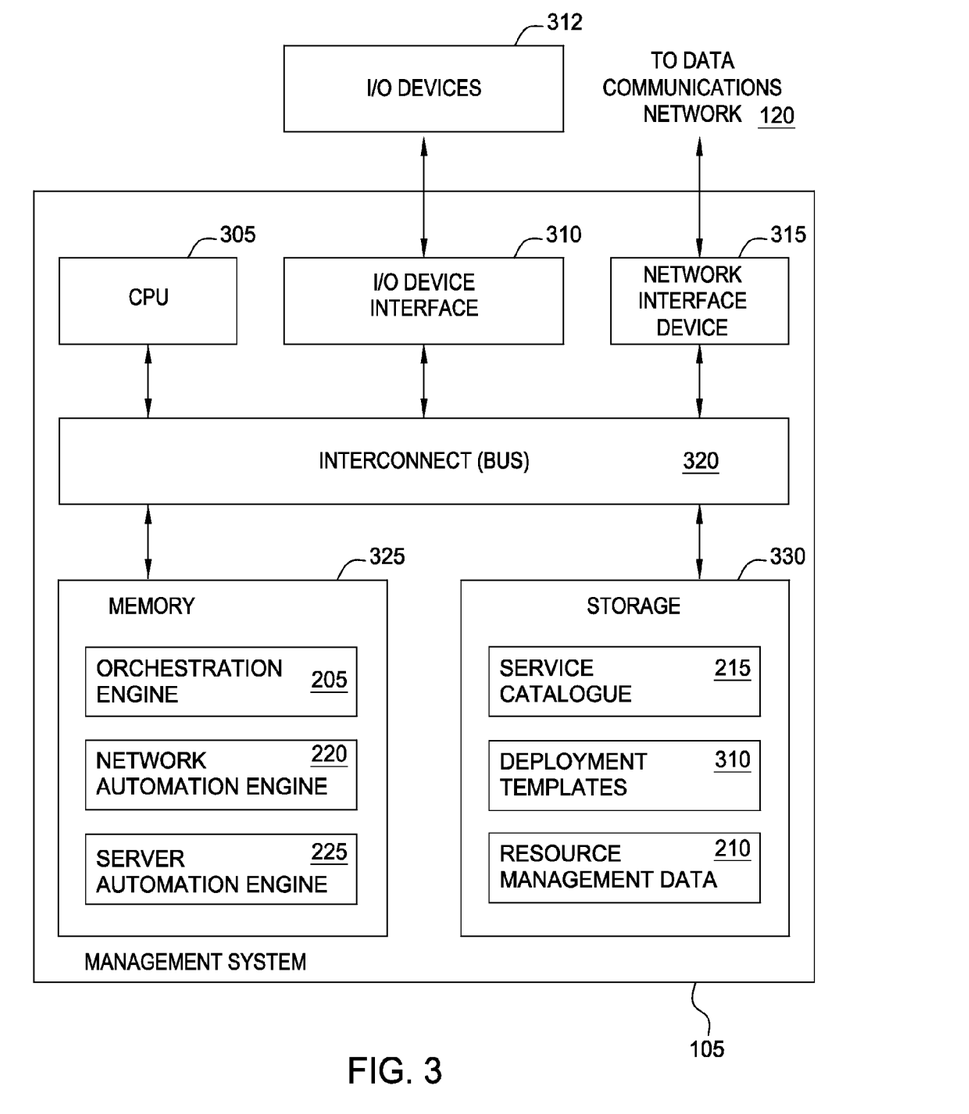
FIG. 3 illustrates an example computing system used to execute the management components first illustrated in FIG. 2, according to certain embodiments of the present disclosure.

FIG. 3 further illustrates the network container management system 105 and the management components first illustrated in FIGS. 1 and 2, according to certain embodiments of the present disclosure. As shown, the network container management system 105 includes, without limitation, a central processing unit (CPU) 305, a network interface 315, an interconnect 320, a memory 325, and storage 330. The monitoring system 135 may also include an I/O device interface 310 connecting I/O devices 212 (e.g., keyboard, display and mouse devices) to the monitoring system 135.

In general, the CPU 305 retrieves and executes programming instructions stored in the memory 325. Similarly, the CPU 305 stores and retrieves application data residing in the memory 325. The interconnect 320 facilitates transmission of programming instructions and application data between the CPU 305, I/O devices interface 310, storage 330, network interface 315, and memory 325. CPU 305 is included to be representative of a single CPU, multiple CPUs, a single CPU having multiple processing cores, and the like. And the memory 325 is generally included to be representative of a random access memory. The storage 330 may be a disk drive storage device. Although shown as a single unit, the storage 330 may be a combination of fixed and/or removable storage devices, such as fixed disc drives, floppy disc drives, tape drives, removable memory cards, optical storage, network attached storage (NAS), or a storage area-network (SAN).

Illustratively, the memory 325 contains the orchestration engine 205, network automation engine 220 and server automation engine 225. And the storage 330 contains the service catalogue 215, deployment templates 310 and resource management data 210. As noted above, orchestration engine 205, network automation engine 220, and server automation engine 225 may provide software applications configured to provision, manage and tear-down a virtualized data center created using a network container and a collection of virtual machines running inside that network container. And the service catalogue 215 may provide a definition for a set of network containers offered made available to users. The deployment templates 310 may identify what parameters need to be specified (and possibly a sequence at which to specify them) in order to provision a given network container. That is, deployment templates 310 may specify a set of variables that need to be specified to create the segmented, virtualized network topology represented by a given network container profile. Examples of such parameters include a VLAN address or an IP address, VRF routes, etc.

Figure 4:
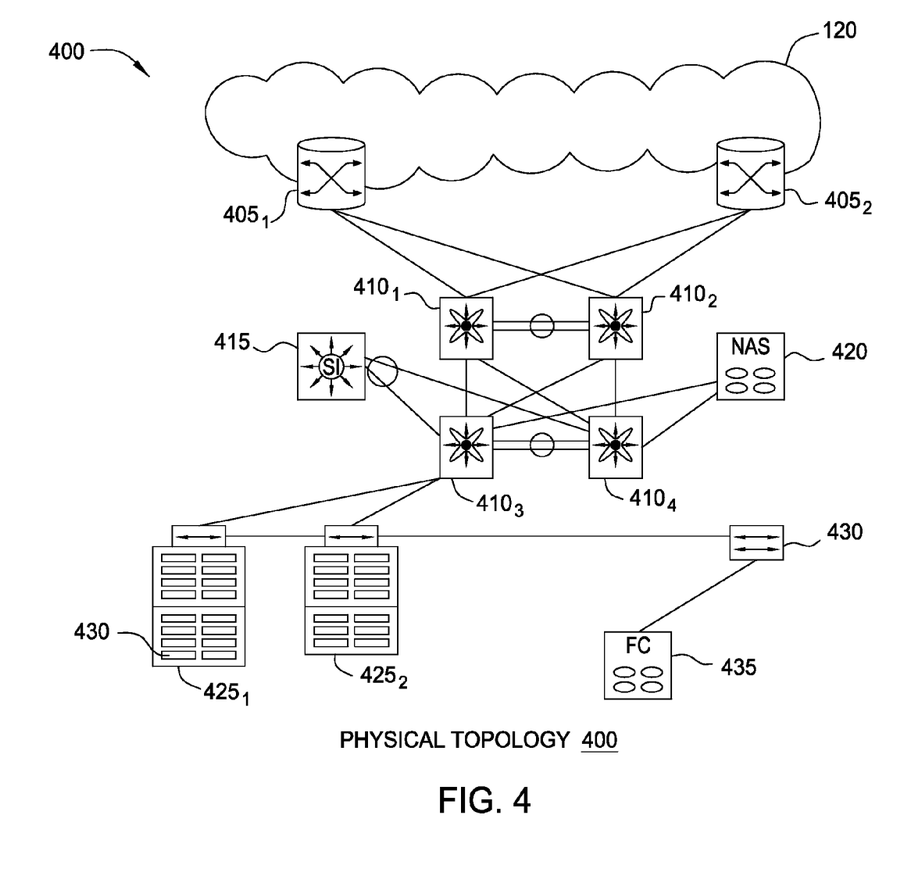
FIG. 4 illustrates an example of a data center infrastructure used to host virtualized data centers, according to certain embodiments of the present disclosure.

FIG. 4 illustrates an example of a data center infrastructure used to host virtualized data centers, according to certain embodiments of the present disclosure. That is, FIG. 4 illustrates a topology 400 for a physical computing infrastructure 125 on which multiple network containers may be provisioned upon request using the network container management system 105 described above. As shown, a service provider is connected to an external network using provider edges $405_{1-2}$. Behind the provider edges $405_{1-2}$ are routers $410_{1-4}$, which may be used to route traffic towards a server core provided by chassis $425_{1-2}$. In this example, each chassis $425_{1-2}$ houses a set of server computing systems 430 (e.g., blade systems or rack mounted servers) connected to a top-of-rack switch $440_{1-2}$. Computing system 430 may be configured to host virtual machines 140 launched by the virtualization manger 220 and server automation manager 225, in response to user requests.

Additionally, each chassis $425_{1-2}$ is connected to a Fibre Channel storage fabric 435 using switch 430. Connected to the routers $410_{1-4}$ is a management appliance 415 used to configure the ports, channels, and routing actions provided by the routers $410_{1-4}$. Additionally, network attached storage (NAS) 420 provides a storage repository for access over the network.

Of course, one of ordinary skill in the art will recognize that the network topology used by a given data center or cloud computing service provider may be tailored to suit the needs in a particular case. And further, that the topology 400 illustrated in FIG. 4 is included to provide just one example of a network and server infrastructure used to provide network containers and virtualized data centers using a cloud-based service offering.

Figure 5:
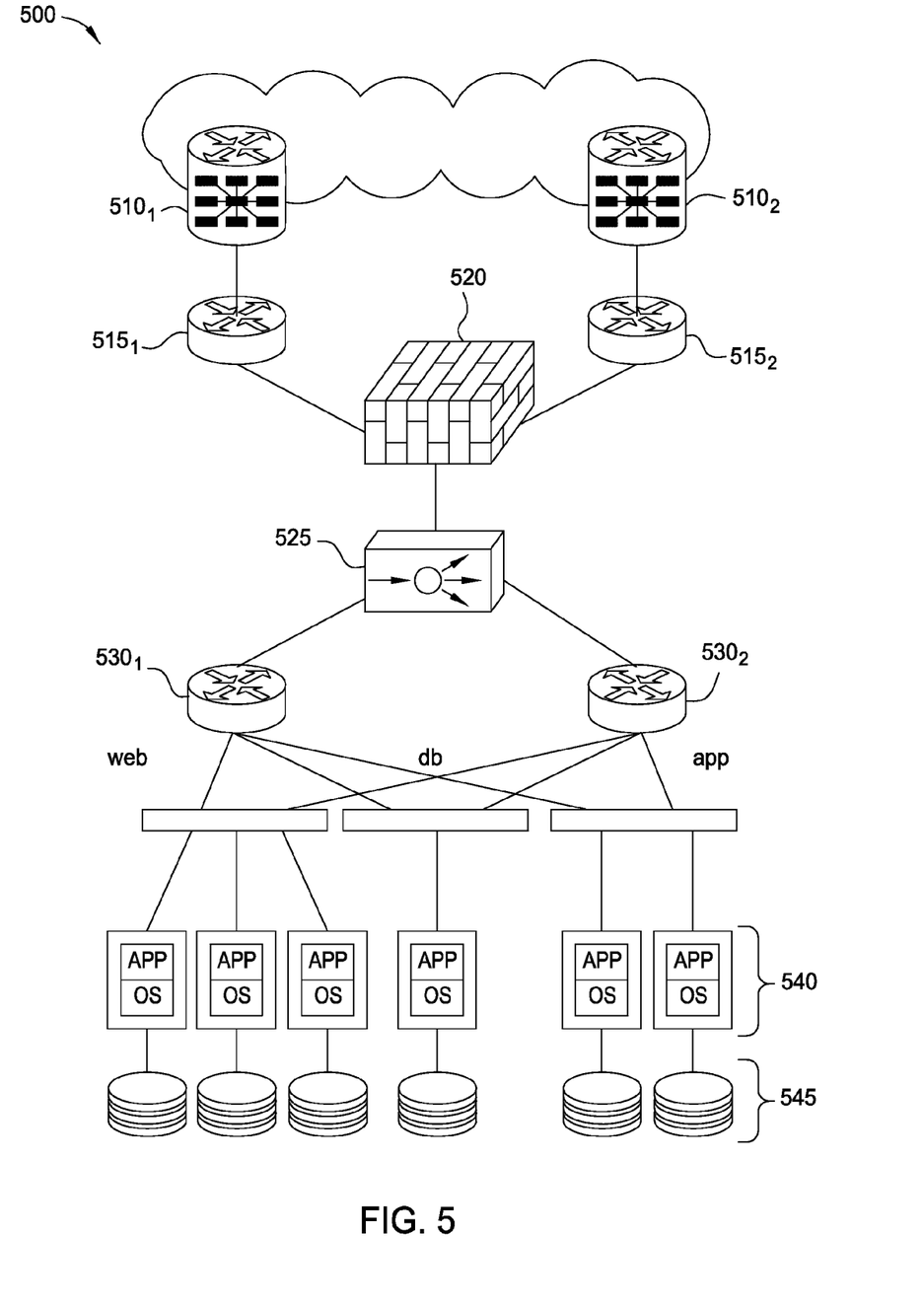
FIG. 5 illustrates an example logical topology for a virtualized data center, according to certain embodiments of the present disclosure.

FIG. 5 illustrates an example logical topology 500 for a virtualized data center, according to certain embodiments of the present disclosure. Importantly, each of the network, computing and storage resources shown in the logical topology 500 are virtualized systems provisioned on an underlying physical topology (e.g., the physical computing infrastructure shown in FIG. 4).

As shown, a network container is connected to an external network using provider edges $510_{1-2}$. Behind the provider edges $510_{1-2}$ is a staging zone where routers send traffic to a firewall 520. Behind the firewall 520 is a load balancer 525 used to scale, e.g., websites that have more than one web server distributing the load between multiple web servers. Also behind the firewall 520 are routers $530_{1-2}$ used to route traffic to applications running on virtual machines 540. The virtual machines 540 are configured to store data in storage repositories 545 (e.g., a Fiber Channel storage fabric with storage volumes dedicated to this network container). In this example, the virtual machines 540 are executing web servers, a database and applications servers. Accordingly, the network container and virtualized data center illustrated by FIG. 5 could be used to provide an end-to-end service for an online retailer. As the needs of the online retailer change, the network container (or the virtual machines 540) could be scaled-up or down to respond to changes in demand. Of course, one of ordinary skill in the art will recognize logical topology 500 provides an example of a network container and virtualized data center and the logical topology provided by a given network container may be tailored to suit the needs of a given service provider (or user).

Figure 6:
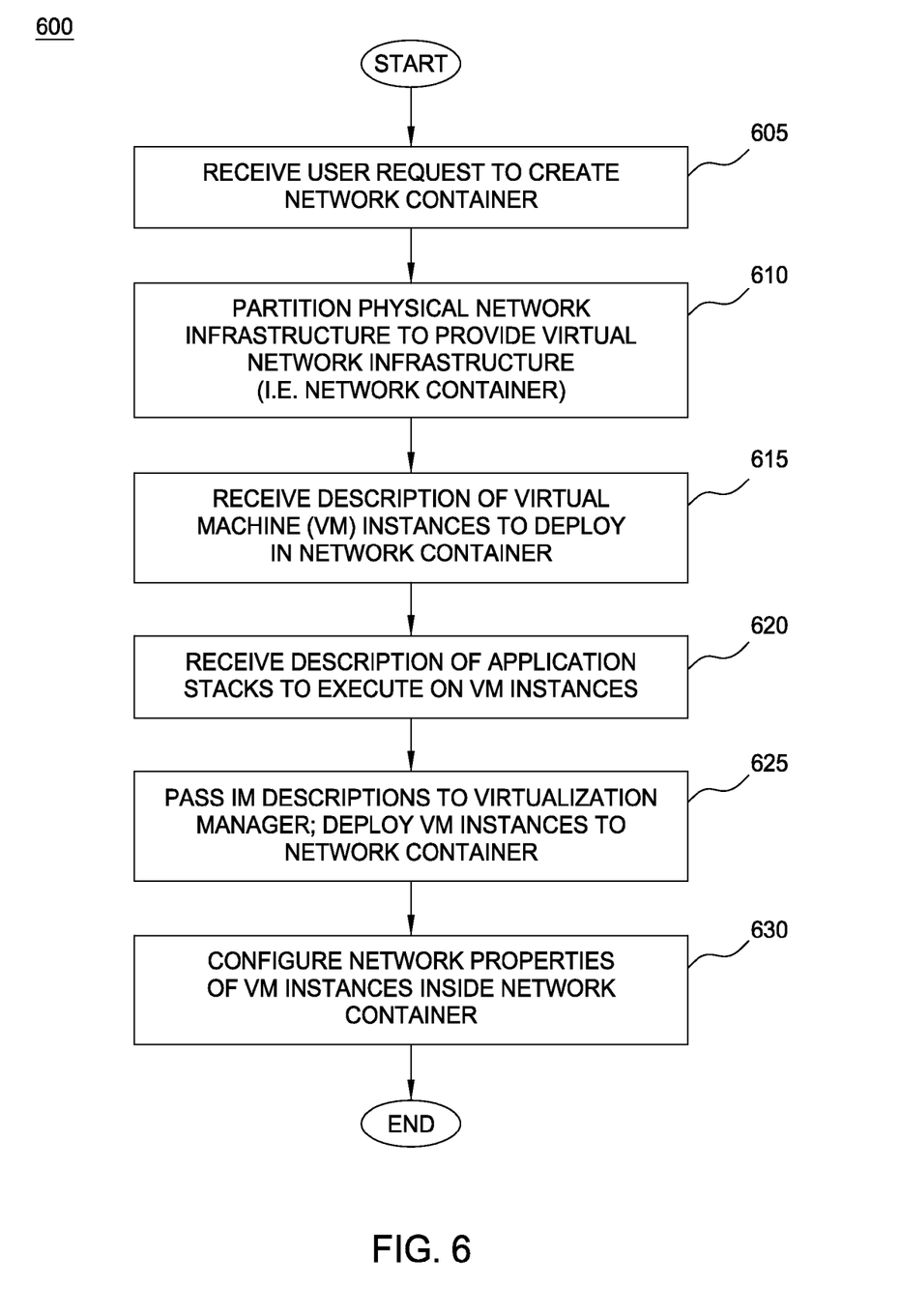
FIG. 6 illustrates a method for providing a requesting user with a virtualized data center, according to certain embodiments of the present disclosure.
Figure 8A:
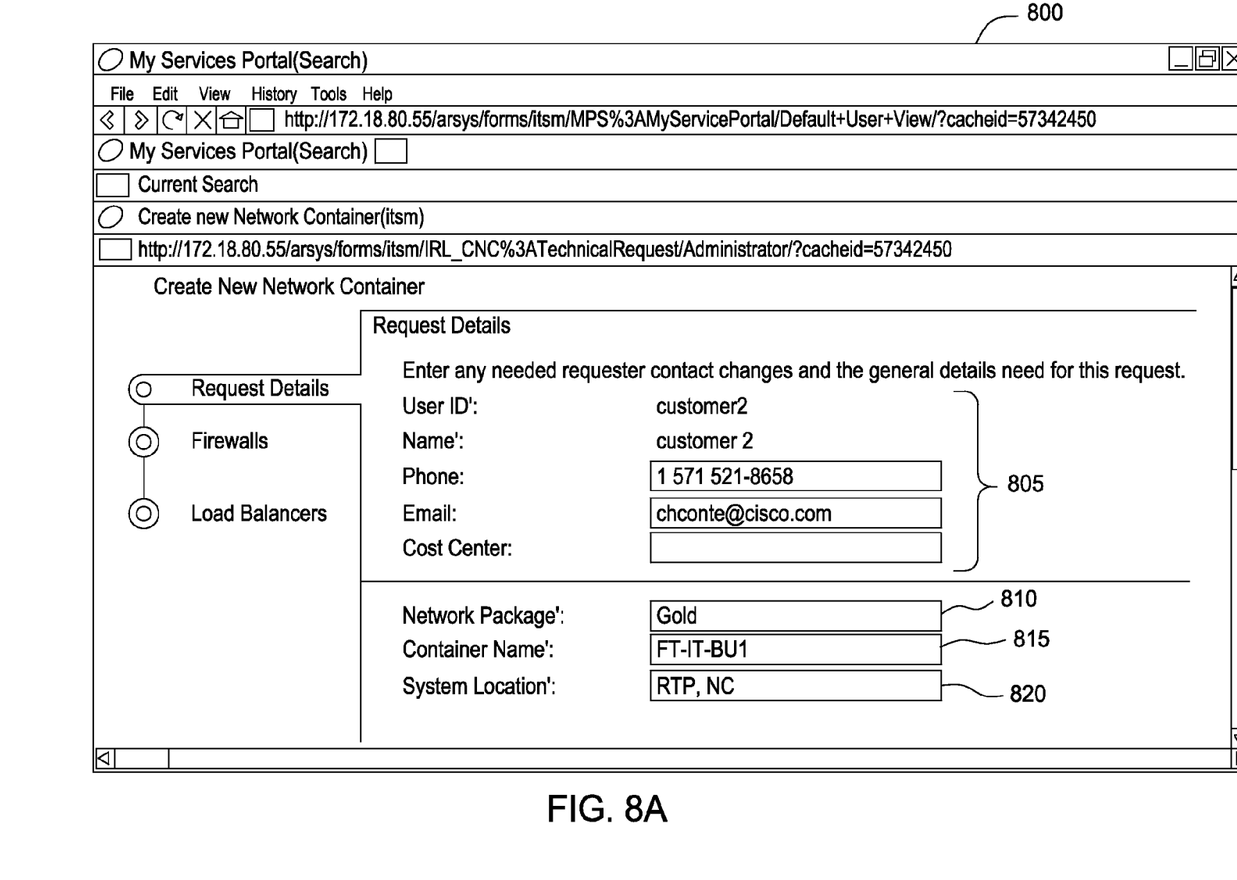
FIG. 8A-8D illustrate an example web-portal used to request and specify settings for a network container offering from a cloud computing services provider, according to certain embodiments of the present disclosure.

FIG. 6 illustrates a method 600 for providing a requesting user with a virtualized data center, according to one embodiment of the present disclosure. As shown, the method 600 begins at step 605 a user submits a request for a network container. The request may specify a network container selected from a predefined group of network containers made available by a service provider. As noted above, in one embodiment, a user may interact with a self-service portal to specify settings for the network container to be provisioned. For example, FIG. 8A illustrates an interface 800 on a web-portal used to request and specify settings for a network container offering from a cloud computing service provider. As shown in FIG. 8A, after logging in using a registered user ID, a user may supply contact information using form elements 805. Additionally, the interface 800 allows a user to specify what service offering should be provisioned. That is, the user may select what network container should be provisioned as part of building a virtualized data center. Illustratively, the user has selected a "gold" network container 810, as well as specified both a name 815 used to reference the network container once provisioned and a data center location 820 at which the network container should be provisioned.

Figure 8B:
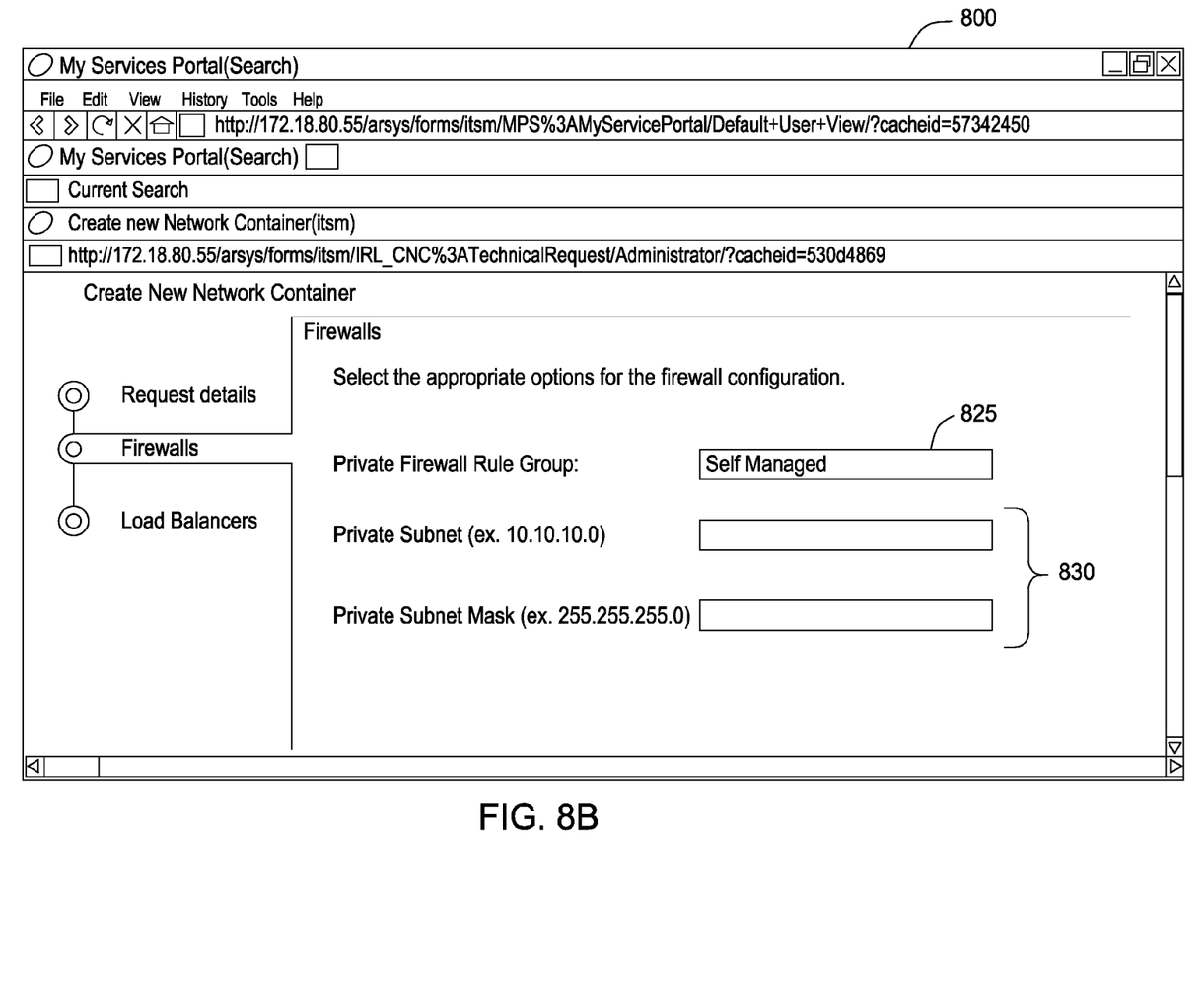
Figure 8C:
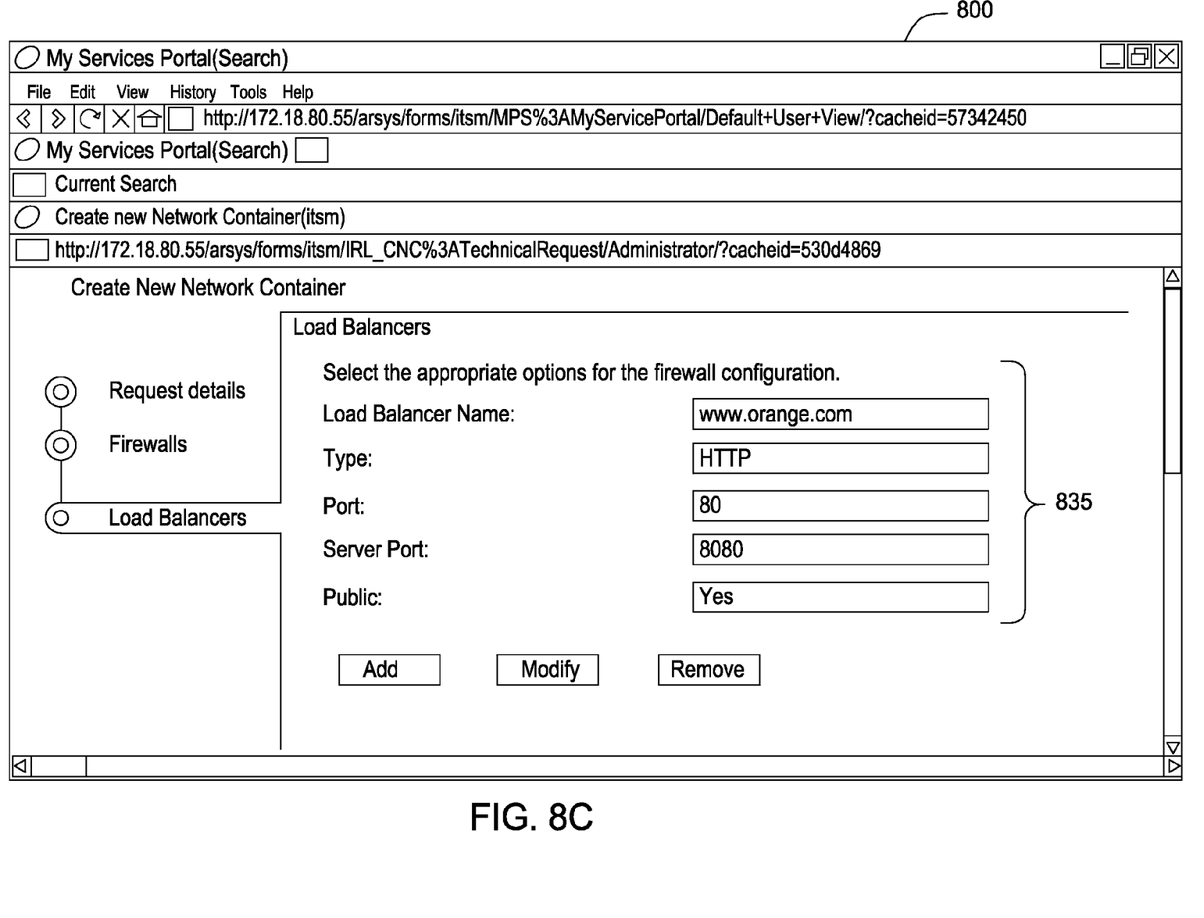

Once the user specifies a network container type (such as the "gold" network container), the interface 800 may prompt the user to specify settings for certain elements of that network container. For example, as noted above, the "gold" network container could include a virtualized firewall appliance and a virtualized load balancer. Accordingly, FIG. 8B illustrates interface 800 after a user has completed the form elements of in FIG. 8A. As shown in FIG. 8B, the user may specify a rule group for a firewall using form element 805 as well as specify both an address range for a private subnet behind the firewall and a mask address for that subnet using form elements 810. Similarly, FIG. 8C shows interface 800 after the user has specified the request details and firewall rules for their network container. In this example, once the firewall settings are specified, interface 800 then allows the user to specify settings for a load balancer for their network container using form elements 835. In this example, the form elements allow the user to specify a reference name, network protocol type, port values for the network protocol type and for the server, and whether the load balancer is public (i.e., whether the load balancer is visible to external network traffic).

Returning to the method 600 shown in FIG. 6, at step 610, the orchestration engine provisions the network container requested at step 605. As noted above, e.g., the orchestration engine may process a sequence of templates associated with the network container to specify variable and parameter settings needed to create an instance of the logical network topology associated with the requested network container. In one embodiment, the orchestration engine may be configured to invoke API methods exposed by the network automation engine to pass it settings for the requested network container. In turn, the network automation engine may receive the variable and parameter settings and generate the appropriate commands executed on the available physical networking infrastructure to provision the requested network container. For example, the orchestration engine could generate a segmented instance of the logical topology 500 shown in FIG. 5 on the physical topology 400 shown in FIG. 4. Further, the orchestration engine could provision a firewall and a load balancer for a "gold" network container based on the settings specified in the form elements shown in FIGS. 8A, 8B and 8C.

Figure 8D:
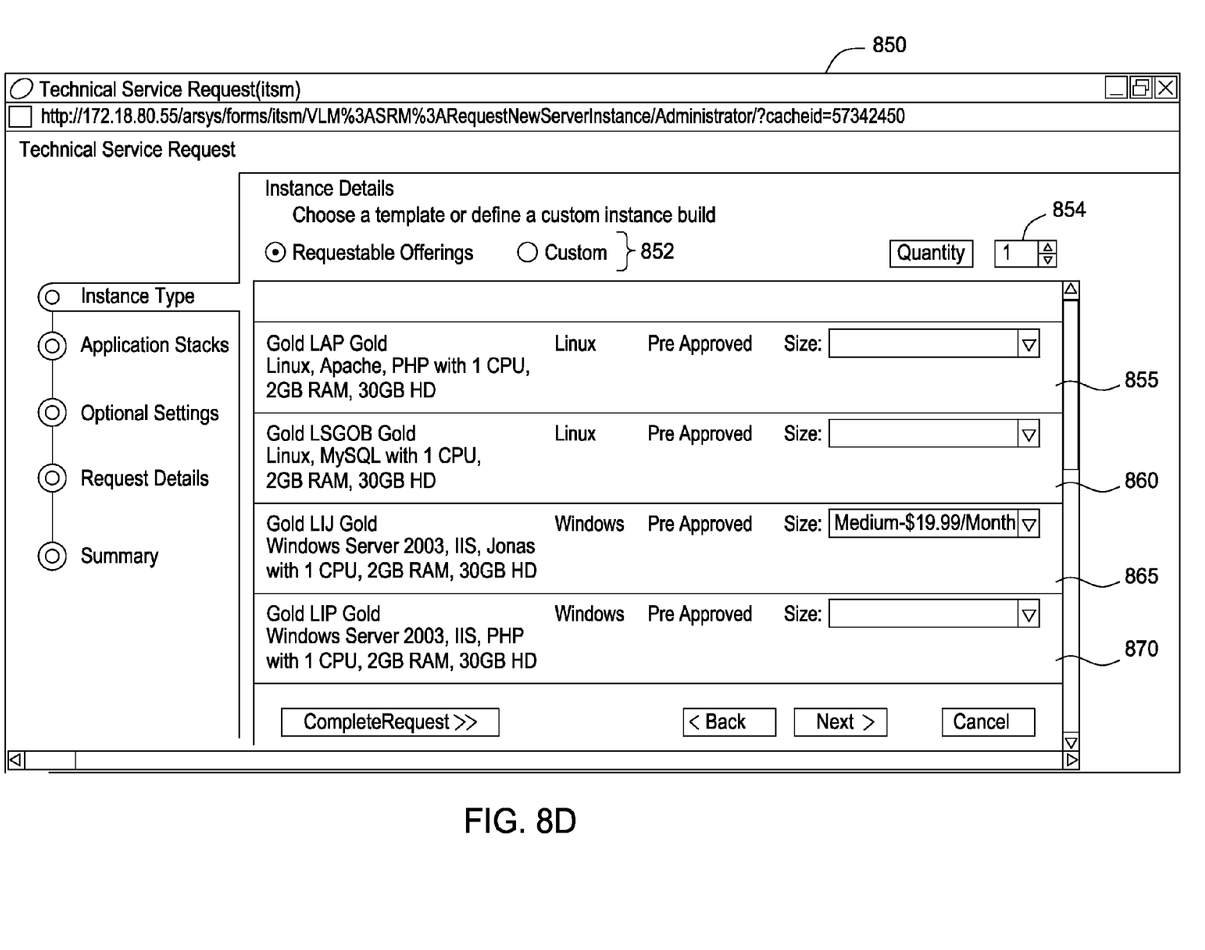

At step 615, the orchestration engine may receive a request to provision a set of one or more virtual machine instances within the provisioned network container. And at step 620, the orchestration engine may receive a description of application or application stacks to deploy on the requested virtual machine instances. As noted, the orchestration engine may receive the requests in messages passed from the self-service portal interface used to provision the network container. For example, FIG. 8D shows an interface 850 which allows a user to specify virtual machine instances and application stacks. As shown, a user can select between four different virtual machine configurations 855, 860, 865 and 870 or specify their own custom virtual machine instances using radio button 852. Additionally, a user may specify how many instances of a given type should be provisioned in their network container using form element 854.

In the particular example of FIG. 8D, a user may select virtual machine instance 855 to provision a web server with a distribution of the Linux® operating system, the Apache® web server and a PHP interpreter on a virtual machine with 1 virtual CPU, 2 GB of ram and 30 GB of storage capacity. Similarly, virtual machine instance 850 may be selected to create a database server provisioned with the MySQL® database application. Virtual machine instances 865 and 870 provide comparable virtual machine instances provisioned with a server version of the Windows® operating system. Of course, one of skill in the art will recognize that virtual machine instances configured using interface 850 could include a variety of operating systems, virtualized hardware components, and application stacks.

Returning to the method 600 shown in FIG. 6, at step 625, the orchestration engine may pass descriptions of the requested virtual machines to the virtualization manager. In turn, the virtualization manager instantiates and deploys the requested virtual machine to the server computing systems available at the service provider data center. Additionally, once instantiated, the network properties of the virtual machine instances in the network container may be configured as well (step 630).

Figure 7:
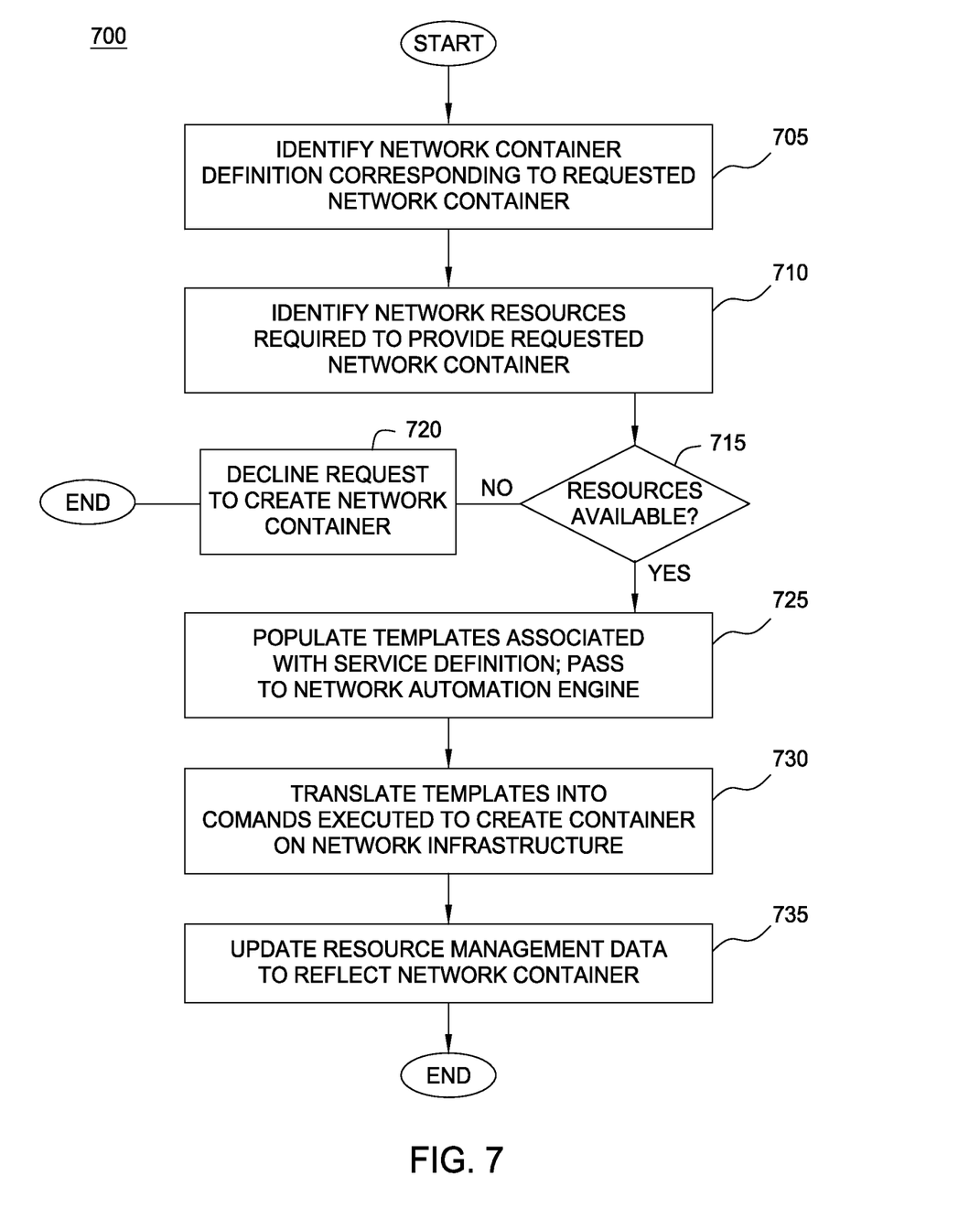
FIG. 7 illustrates a method for provisioning a network container, according to certain embodiments of the present disclosure.

FIG. 7 illustrates a method 700 for provisioning a network container, according to certain embodiments of the present disclosure. In particular, method 700 further illustrates actions which may be performed by the orchestration engine as part of step 610 of the method 600. As shown, the method 700 begins at step 705, where the orchestration engine identifies a network container definition corresponding to a requested network container. And at step 705, the orchestration engine may identify the network resources required to provide the requested network container. At step 715, the orchestration engine determines whether the resources are available in the underling physical computing infrastructure used to host network containers. If not, then at step 720, the system declines to provision the requested network container.

Otherwise, at step 725, the orchestration engine may begin populating a set of templates associated with the service definition for the requested network container. As the templates are populated, they may be passed to the network automation engine. For example, in one embodiment, the templates may be composed using an XML grammar and passed as part of a WSDL document to the network automation engine. In turn, at step 730, the network automation engine may translate the templates into commands used to provision network, compute and storage resources at the service provided data center. That is, the network automation engine may generate commands executed to provision the requested network container on the underlying computing infrastructure of the service provider. Once provisioned, at step 735, the network automation engine may update the resource management data to reflect the newly provisioned network container.

Embodiments described herein provide techniques for automating the provisioning of network containers provided as part of a cloud computing service. As described above, the network container provides an approach for abstracting and automating the provisioning of an end-to-end network partition or virtualized data center for multi-tenant users as well as a method for launching and executing virtual machines (VMs) in a given user's network partition. Each virtualized data center provides services such as load balancing, firewall, multi-VLANs (sub-container's), MPLS VPN services, delivered to users as a complete end-to-end service. More generally, the network container provides a logical network or partition of a shared physical network infrastructure. Thus, multiple users may provision a network containers ultimately hosted using the same underlying shared infrastructure. For example, each network container running of a shared infrastructure can re-use the same IP address space. Thus, the network container helps a service provider maximize hardware utilization as well as allow functionalities such as security and application optimization to be managed by the customer.

Once provisioned, users can configure and launch virtual machine instances and applications within their respective network containers. Together, the network container and virtual machine instances provide users with an end-to-end fully virtualized data center. That is, the virtualized data center provides users with a segmented virtual network located in the cloud, typically alongside virtualized data centers of other users. Such a virtualized data center may be rapidly scaled up (or down) according to the computing needs of a given user without the need to maintain excess computing capacity between peak demand periods.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A computer-implemented method, comprising:
receiving a request to provision a network container selected from a plurality of predefined network container definitions, wherein each network container definition defines a distinct logical network topology to be hosted on a physical network infrastructure, wherein the logical network topology specifies a configuration for one or more of virtual routing and forwarding (VRF) tables, virtual private networks (VPN), and virtual Local Area Networks (VLANs) to provision for the network container, wherein a first one of the plurality of network container definitions specifies a base configuration including at least an access point, an internet protocol (IP) address range, and routing information, and wherein a second network container definition extends the base configuration, wherein the physical network infrastructure hosts a plurality of network containers, and wherein each network container provides complete logical segmentation from other network containers, of the plurality, on the physical network infrastructure;
receiving a set of one or more parameters specifying a configuration state for the requested network container;
populating one or more templates using the parameters and a network container profile associated with the requested network container; and
provisioning the requested network container by translating the populated templates into a sequence of commands executed to configure the physical network infrastructure to host the requested network container.

2. The method of claim 1, further comprising:
receiving a request to provision one or more virtual machine instances within the network container; and
launching the requested virtual machine instances on one or more computing systems, wherein each of the launched virtual machine instances are networked within the logical network topology provided by the provisioned network container.

3. The method of claim 2, wherein the request to provision at least a first one of the virtual machines includes a request to install an application stack on the first virtual machine instance.

4. The method of claim 3, wherein the application stack includes at least one of an application server, a web server, and a database application.

5. The method of claim 1, wherein the logical topology of the requested network container includes a virtualized firewall and wherein at least one of the templates is used to provision the virtualized firewall.

6. The method of claim 1, wherein the logical topology of the requested network container includes a virtualized load balancer and wherein at least one of the templates is used to provision the virtualized load balancer.

7. The method of claim 1, wherein the network container profile specifies one or more virtualized networking infrastructure devices included in the logical network topology.

8. A non-transitory computer-readable storage medium storing code for execution by a central processing unit (CPU), wherein the code, when executed by the CPU, performs an operation, the operation comprising:
receiving a request to provision a network container selected from a plurality of predefined network container definitions, wherein the logical network topology specifies a configuration for one or more of virtual routing and forwarding (VRF) tables, virtual private networks (VPN), and virtual Local Area Networks (VLANs) to provision for the network container, wherein each network container definition defines a distinct logical network topology to be hosted on a physical network infrastructure, wherein a first one of the plurality of network container definitions comprises a base configuration including at least an access point, an internet protocol (IP) address range, and routing information, and wherein a second network container definition extends the base configuration, wherein the physical network infrastructure hosts a plurality of network containers, and wherein each network container provides complete logical segmentation from other network containers, of the plurality, on the physical network infrastructure;
receiving a set of one or more parameters specifying a configuration state for the requested network container;
populating one or more templates using the parameters and a network container profile associated with the requested network container; and
provisioning the requested network container by translating the populated templates into a sequence of commands executed to configure the physical network infrastructure to host the requested network container.

9. The computer-readable storage medium of claim 8, wherein the operation further comprises:
receiving a request to provision one or more virtual machine instances within the network container; and
launching the requested virtual machine instances on one or more computing systems, wherein each of the launched virtual machine instances are networked within the logical network topology provided by the provisioned network container.

10. The computer-readable storage medium of claim 9, wherein the request to provision at least a first one of the virtual machines includes a request to install an application stack on the first virtual machine instance.

11. The computer-readable storage medium of claim 10, wherein the application stack includes at least one of an application server, a web server, and a database application.

12. The computer-readable storage medium of claim 8, wherein the logical topology of the requested network container includes a virtualized firewall and wherein at least one of the templates is used to provision the virtualized firewall.

13. The computer-readable storage medium of claim 8, wherein the logical topology of the requested network container includes a virtualized load balancer and wherein at least one of the templates is used to provision the virtualized load balancer.

14. The computer-readable storage medium of claim 8, wherein the network container profile specifies one or more virtualized networking infrastructure devices included in the logical network topology.

15. A system, comprising:
a memory; and
a processor storing one or more application programs, which, when executed on the processor, are configured to perform an operation, comprising:
receiving a request to provision a network container selected from a plurality of predefined network container definitions, wherein each network container definition defines a distinct logical network topology to be hosted on a physical network infrastructure, wherein the logical network topology specifies a configuration for one or more of virtual routing and forwarding (VRF) tables, virtual private networks (VPN), and virtual Local Area Networks (VLANs) to provision for the network container, wherein a first one of the plurality of network container definitions comprises a base configuration including at least an access point, an internet protocol (IP) address range, and routing information, and wherein a second network container definition extends the base configuration, wherein the physical network infrastructure hosts a plurality of network containers, and wherein each network container provides complete logical segmentation from other network containers, of the plurality, on the physical network infrastructure,
receiving a set of one or more parameters specifying a configuration state for the requested network container,
populating one or more templates using the parameters and a network container profile associated with the requested network container, and
provisioning the requested network container by translating the populated templates into a sequence of commands executed to configure the physical network infrastructure to host the requested network container.

16. The system of claim 15, wherein the operation further comprises:
receiving a request to provision one or more virtual machine instances within the network container; and
launching the requested virtual machine instances on one or more computing systems, wherein each of the launched virtual machine instances are networked within the logical network topology provided by the provisioned network container.

17. The system of claim 16, wherein the request to provision at least a first one of the virtual machines includes a request to install an application stack on the first virtual machine instance.

18. The system of claim 17, wherein the application stack includes at least one of an application server, a web server, and a database application.

19. The system of claim 15, wherein the logical topology of the requested network container includes a virtualized firewall and wherein at least one of the templates is used to provision the virtualized firewall.

20. The system of claim 15, wherein the logical topology of the requested network container includes a virtualized load balancer and wherein at least one of the templates is used to provision the virtualized load balancer.

21. The system of claim 15, wherein the network container profile specifies one or more virtualized networking infrastructure devices included in the logical network topology.

* * * * *